United States Patent
Ohishi

(10) Patent No.: US 6,837,352 B2
(45) Date of Patent: Jan. 4, 2005

(54) ONE-WAY CLUTCH APPARATUS

(75) Inventor: Hiroyuki Ohishi, Hamakita (JP)

(73) Assignee: NSK-Warner K.K., Tokyo (JP)

(*) Notice: Subject to any disclaimer, the term of this patent is extended or adjusted under 35 U.S.C. 154(b) by 0 days.

(21) Appl. No.: 10/207,979

(22) Filed: Jul. 31, 2002

(65) Prior Publication Data

US 2003/0024786 A1 Feb. 6, 2003

(30) Foreign Application Priority Data

Aug. 1, 2001 (JP) .......................................... 2001-271024

(51) Int. Cl.[7] .............................................. F16D 41/06
(52) U.S. Cl. .................................. 192/41 A; 192/113.32
(58) Field of Search .......................... 192/113.32, 41 R, 192/45.1, 41 A; 184/6.12

(56) References Cited

U.S. PATENT DOCUMENTS

| | | | | |
|---|---|---|---|---|
| 5,474,152 A | * | 12/1995 | Wilkinson et al. | 184/6.12 |
| 5,638,936 A | * | 6/1997 | Kinoshita et al. | 192/113.32 |
| 5,671,836 A | * | 9/1997 | Shirataki et al. | 192/113.32 |
| 5,687,826 A | * | 11/1997 | Kinoshita et al. | 192/113.32 |
| 6,401,893 B1 | * | 6/2002 | Kinoshita | 192/45.1 |
| 6,443,289 B1 | * | 9/2002 | Sagae et al. | 192/113.32 |

* cited by examiner

Primary Examiner—Saul Rodriguez
(74) Attorney, Agent, or Firm—Miles & Stockbridge P.C.

(57) ABSTRACT

A pump mechanism is constituted by a groove which is inclined with respect to a diametrical direction on a side surface of an inner wheel, and a side surface of an inner diameter side extending portion which opposes to the side surface, and a lubricating oil is supplied to an inner wheel raceway surface and a sprag by the pump mechanism.

4 Claims, 3 Drawing Sheets

ONE-WAY CLUTCH APPARATUS

BACKGROUND OF THE INVENTION

1. Field of the Invention

The present invention relates to a one-way clutch apparatus used as a backstop for an automatic transmission or the like which is employed in industrial equipment such as an agricultural machine, a motor vehicle, a construction machine and the like.

2. Related Background Art

The one-way clutch is structured such that a torque transmission member slides with respect to an inner wheel or an outer wheel at a time of idle rotation. In order to prevent an abrasion or a seizure due to a sliding motion, it is necessary to supply a lubricating fluid or oil to a surface sliding with the torque transmission member.

FIG. 3 is a cross sectional view in an axial direction which shows a lubricating structure of a conventional one-way clutch apparatus. A one-way clutch apparatus 51 is structured such that a one-way clutch 54 is arranged between an inner wheel 52 and an outer wheel 53 which are arranged coaxially. A sprag 59 is used in the torque transmission member, and this sprag 59 slides with respect to the inner wheel 52. An oil hole 58 that supplies lubricating oil toward the sliding surface is provided in the inner wheel 52.

However, in the conventional one-way clutch apparatus, since the oil hole 58 is provided on a surface that is directly exposed to a torque applied from the sprag 59, a surface pressure in the periphery of an opening portion of the oil hole 58 and in the sprag 59 positioned there tends to become high. Further, at a time of designing the one-way clutch apparatus 51, it is necessary to set a number of the sprag 59 to be more, and a cost is increased at that degree. Further, in order to stand against a high speed rotation and a high load, the one-way clutch apparatus is provided with a portion extending to a portion in an inner diameter side rather than the one-way clutch in the outer wheel so as to cover the one-way clutch, and is structured such as to be bearing supported by an inner peripheral surface of the extending portion. In this case, the oil hole 58 is omitted, it is hard to supply the lubricating oil.

SUMMARY OF THE INVENTION

Accordingly, an object of the present invention is to provide a one-way clutch apparatus that can inhibit a surface pressure in the periphery of the opening portion of the oil hole and in the sprag positioned there, can set the number of the sprag to be less, and can secure a lubricating performance to the sprag.

In order to achieve the object mentioned above, in accordance with the present invention, there is provided a one-way clutch apparatus, wherein a member constituting the one-way clutch apparatus has a pump function.

Further, in accordance with the present invention, there is provided a one-way clutch apparatus comprising:

an inner wheel; and an outer wheel having an inner diameter side extending surface which is opposed to a side surface of the inner wheel, wherein a communication groove is provided in at least one of the side surface of the inner wheel and the inner diameter side extending surface. Further, in the structure, the communication groove is communicated in a diametrical direction, and is formed in a linear or circular arc shape having a predetermined angle of incline in the diametrical direction.

Further, in accordance with the present invention, there is provided a one-way clutch apparatus, wherein an oil storage is provided in an inner diameter side of the communication groove.

DESCRIPTION OF THE PREFERRED EMBODIMENTS

Figure 1:
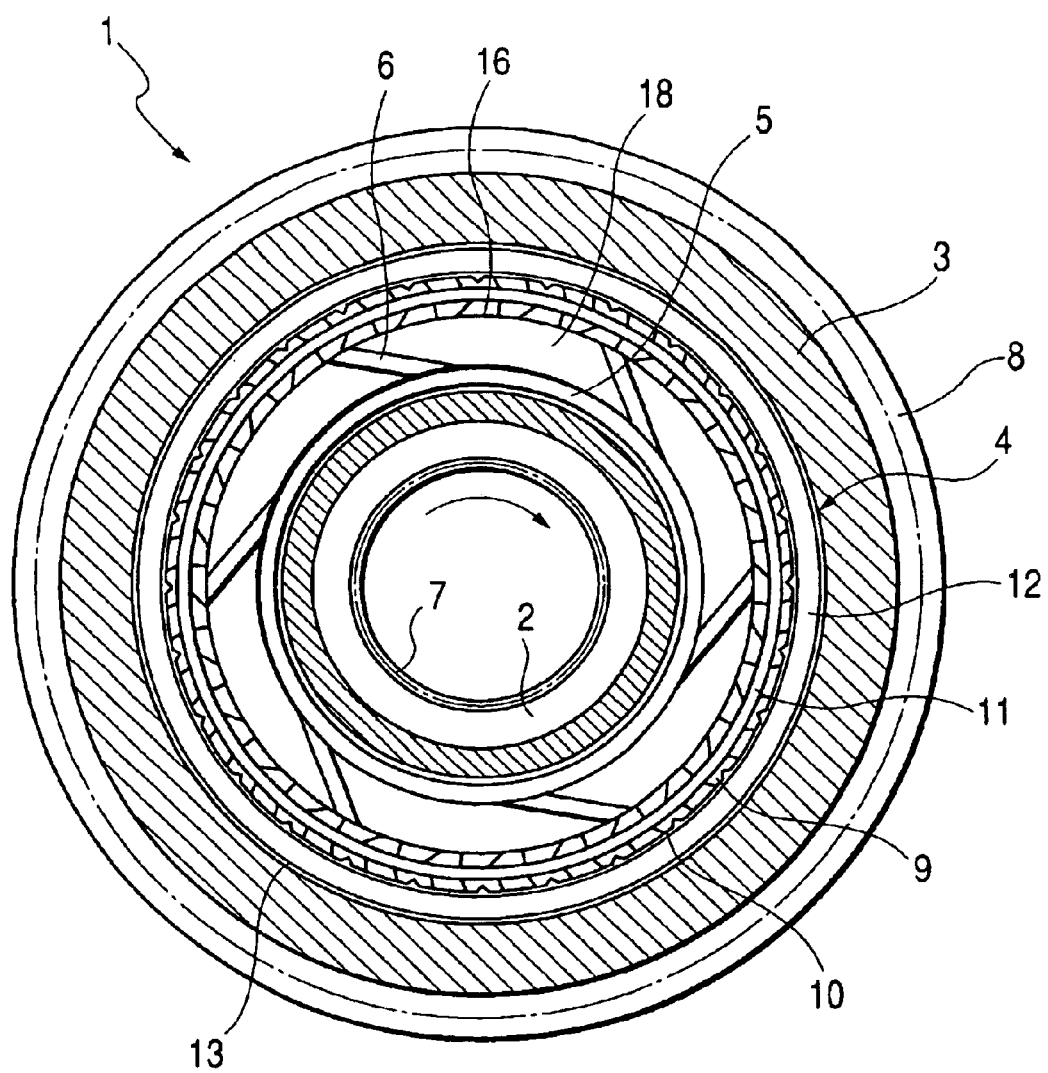
FIG. 1 is a cross sectional view of a one-way clutch apparatus in accordance with an embodiment of the present invention as seen from a front face (a cross sectional view along a line 1—1 in FIG. 2)

A description will be in detail given below of each of embodiments in accordance with the present invention with reference to the accompanying drawings. In this case, it goes without saying that each of the embodiments exemplifies the present invention and does not limit the present invention. Further, in each of the drawings, the same reference numerals denote the same elements.

Figure 2:
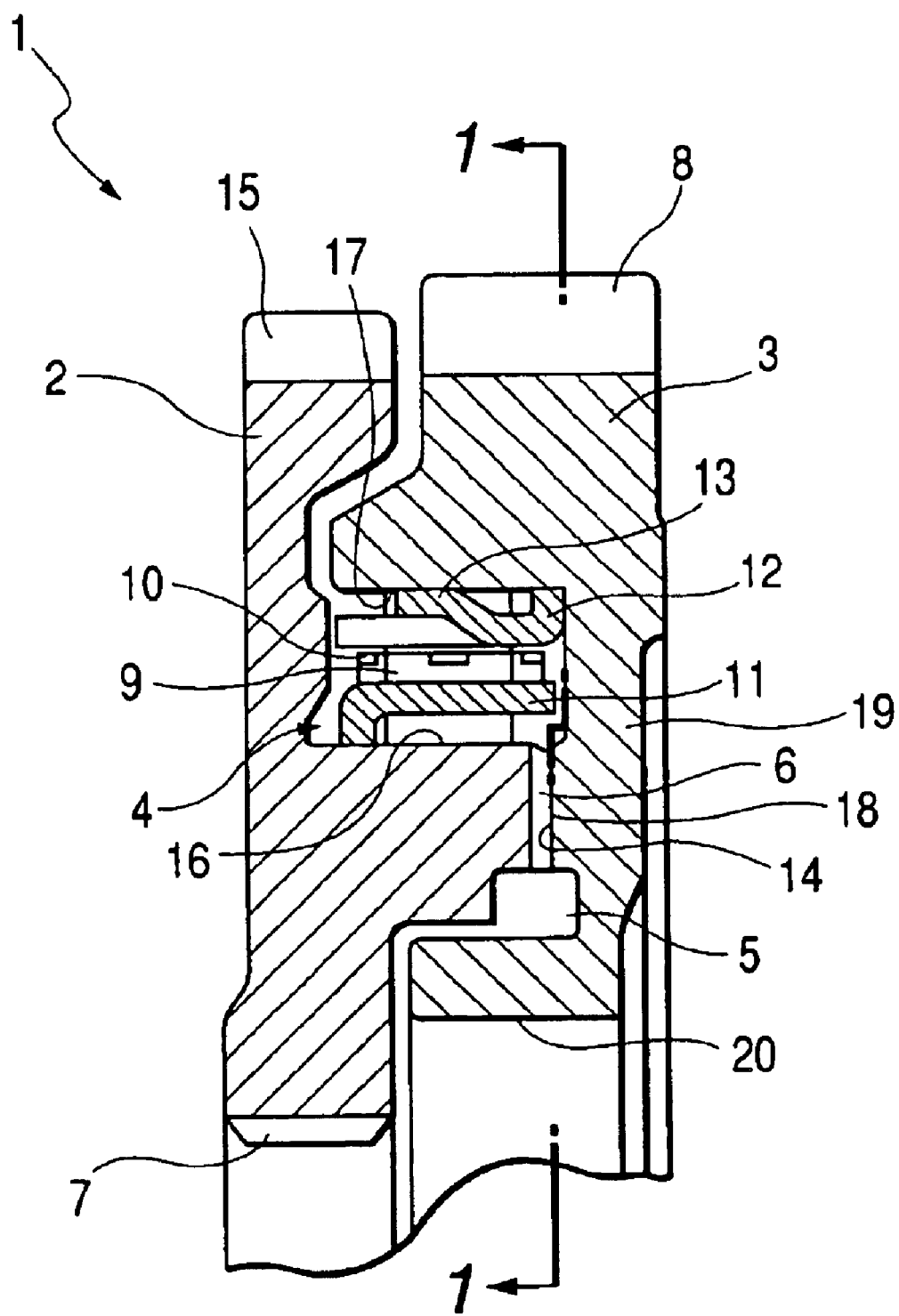
FIG. 2 is a partly cross sectional view in an axial direction of the one-way clutch apparatus in accordance with the embodiment of the present invention.
Figure 3:
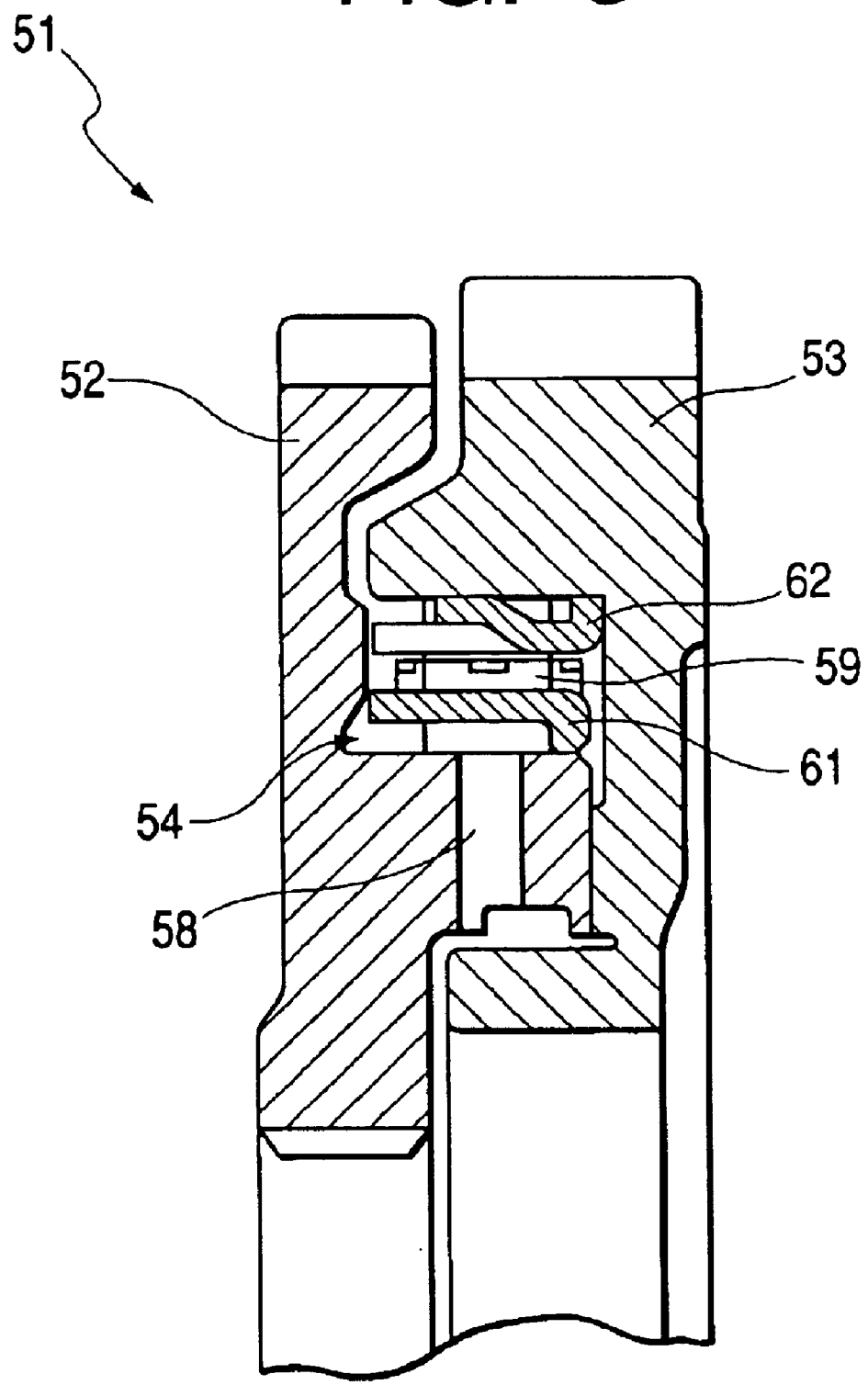
FIG. 3 is a partly cross sectional view in an axial direction of the one-way clutch apparatus in a conventional art.

FIGS. 1 and 2 show the embodiment in accordance with the present invention. FIG. 1 is a cross sectional view along a line 1—1 in FIG. 2, and corresponds to a cross sectional view of a one-way clutch apparatus in accordance with the embodiment of the present invention as seen from a front face. Further, FIG. 2 is a partly cross sectional view in an axial direction of the one-way clutch apparatus in accordance with the embodiment of the present invention. A one-way clutch apparatus 1 is constituted by an inner wheel 2 which has a gear tooth 15 provided in an outer periphery and an inner wheel raceway surface 16, an outer wheel 3 which has a gear tooth 8 provided in an outer periphery and an outer peripheral raceway surface 17, and a one-way clutch 4 which is interposed between the inner wheel raceway surface 16 and the outer wheel raceway surface 17 opposed to each other.

Further, the outer wheel 3 supports one end portion of the one-way clutch 4, and has an extending portion 19 including a surface 14 opposing to a side surface 18 of the inner wheel 2. An inner peripheral surface 20 of the outer wheel 3 is supported by a slide bearing (not shown), a needle bearing or the like.

The one-way clutch 4 is constituted by a sprag 9 as a torque transmission member, a ribbon spring 10 which energized the sprag 9, an outer cage 12 which annularly holds a ribbon spring 10 holding the sprag 9 and has an elastic piece 13 pressing the outer wheel raceway surface 17 toward an outer diameter side, and an inner cage 11 which is arranged in an inner diameter side of the spring 10.

The one-way clutch 4 which is constructed in the manner mentioned above races in accordance with a rotation of the inner wheel 2 in a direction of an arrow shown in FIG. 1. Further, when the inner wheel 2 rotates in an opposite direction, the sprag 9 engages with the inner raceway surface 16 and the outer raceway surface 17 in the inner ring 2, whereby the one-way clutch 4 becomes in a locked state, and a torque transmission is executed.

In the one-way clutch apparatus 1, a communication groove 6 is provided in the side surface 18 of the inner wheel raceway surface 16 in the inner diameter side, and a pump function, that is, a pump function is generated by the communication groove 6 and the inner diameter side extending surface 19 of the outer wheel 3 which opposes to the side surface 18 in an axial direction.

The communication groove 6 that communicates the inner diameter side with the outer diameter side is inclined at a predetermined angle in a clockwise direction, that is, the same direction as the idle rotation direction of the inner wheel from the outer diameter side toward the inner diameter side, as shown in FIG. 1. The communication groove 6 is provided in the inner diameter side of the communication groove 6, and an oil storage portion 5 is defined in a gap between the inner wheel 2 and the outer wheel 3. The communication groove 6 and the oil storage portion 5 are communicated with each other.

Since a centrifugal force which is generated on the basis of the rotation of each of the members in the one-way clutch apparatus 1 is applied to the lubricating oil, by providing with the communication groove 6 and the oil storage portion 5, the lubricating oil is supplied to the oil storage portion 5, and the lubricating oil is forcibly supplied to the one-way clutch 4 on the basis of the pump function of the communication portion 6.

In the embodiment described above, the communication groove 6 is provided on the side surface 18 of the inner wheel raceway surface 16 in the inner diameter side, however, may be provided on the inner diameter side extending surface 19 of the outer wheel 3 in place of the side surface 18. Further, in FIG. 1, the communication groove 6 is linearly provided, however, may be provided in a circular arc shape. In this case, in order to effectively utilize the centrifugal force, it is preferable to be provided so as to be inclined at a predetermined angle in the same direction as the idle rotation direction of the inner wheel.

Since the present invention is carried out in accordance with the aspect mentioned above and it is not necessary to provide the oil hole on the surface on which the torque transmission member slides, there can be obtained effects such that it is possible to reduce the number of the sprag, and it is possible to inexpensively manufacture the one-way clutch apparatus.

What is claimed is:

1. A one-way clutch apparatus comprising:

an inner wheel;

an outer wheel having an extending surface on an inner diameter side, said extending surface being axially opposed to a side surface of said inner wheel; and a torque transmitting member provided between said inner and outer wheels to transmit torque, wherein a communication groove to supply lubricant is provided in at least one of the side surface of said inner wheel and said extending surface of said outer wheel, and is axially offset to said torque transmitting member.

2. A one-way clutch apparatus as claimed in claim 1, wherein said communication groove extends along a radial direction, and is formed in one of a linear and a circular arc shape.

3. A one-way clutch apparatus as claimed in claim 1, wherein an oil store is provided at an inner diameter side of said communication groove.

4. A one-way clutch apparatus as claimed in claim 2, wherein an oil store is provided at an inner diameter side of said communication groove.

* * * * *